July 13, 1937.   L. PAPE   2,087,068
ICE CREAM CONE
Filed Sept. 11, 1936
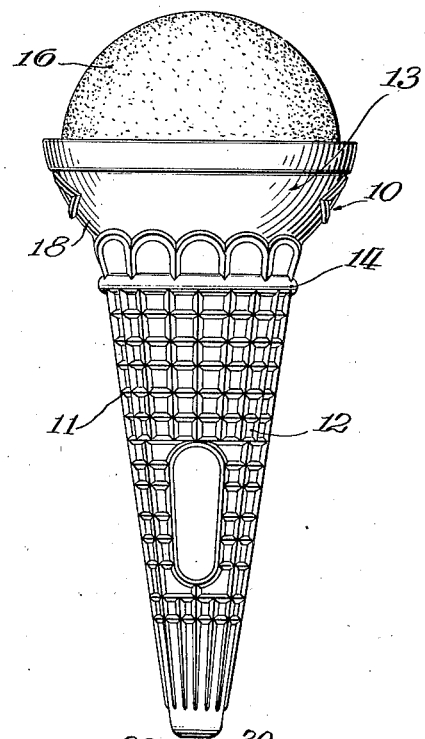
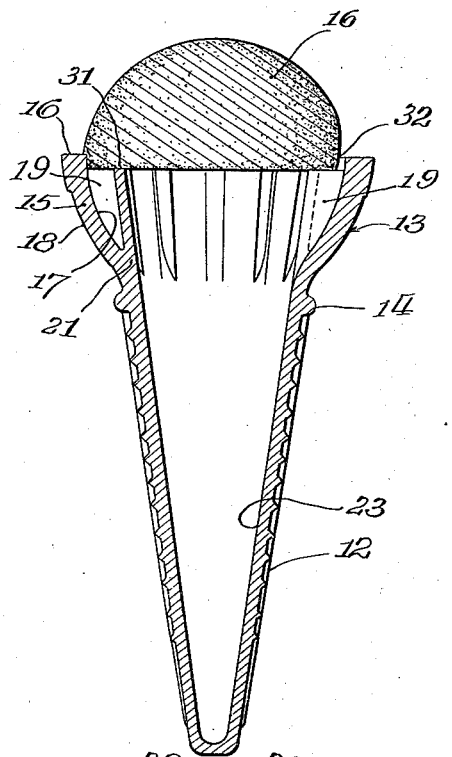
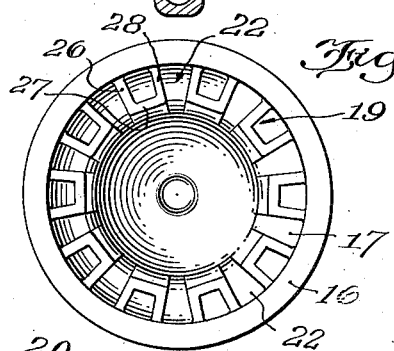
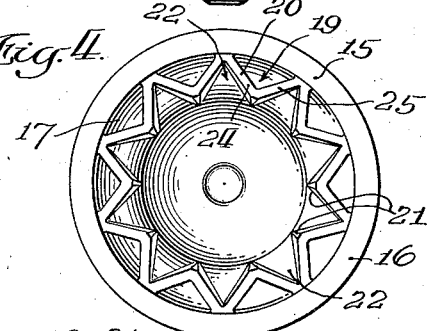
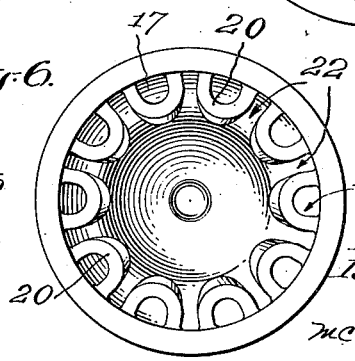
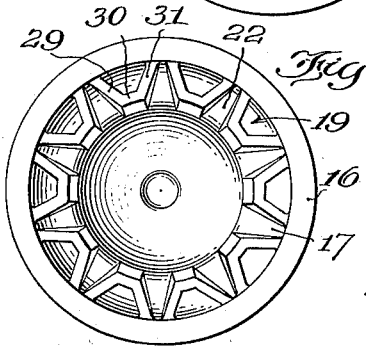
Inventor
Larry Pape
By Williams, Bradbury,
McCaleb & Hinkle
Attys Patented July 13, 1937

2,087,068

UNITED STATES PATENT OFFICE 2,087,068

ICE CREAM CONE

Larry Pape, Chicago, Ill., assignor to The Milko Cone & Baking Co., Inc., Chicago, Ill., a corporation of Illinois Application September 11, 1936, Serial No. 100,280

5 Claims. (Cl. 99—89)

The present invention relates to ice cream cones, and is particularly concerned with ice cream cones which are adapted to prevent drippage and/or adapted to be used in connection with syrups or other food articles, as well as ice cream.

One of the objects of the invention is the provision of an improved ice cream cone in which the portion of ice cream is adapted to be held in such position that any drippage from the melting ice cream is caught by the cone.

Another object of the invention is the provision of an improved cone of the class described, which is adapted to be provided with a multiplicity of small portions of syrup, nuts, or other confectionery or food material to be consumed with the ice cream, and in which the additional confection is suitably spaced and separated so that it cannot run out as soon as a portion of the cone has been consumed.

Another object of the invention is the provision of an improved cone of the class described, adapted to be provided with a multiplicity of portions of additional food or confection, in which these additional portions are so arranged that they do not interfere with the function of catching drippage from the ice cream.

Another object of the invention is the provision of a plurality of improved forms of the cone described, each of which has peculiar advantages due to its form and structure.

Other objects and advantages of the invention will be apparent from the following description and the accompanying drawing, in which similar characters of reference indicate similar parts throughout the several views.

Referring to the single sheet of drawings accompanying the specification,

Fig. 1 is an elevational view of a cone constructed according to the present invention and provided with a portion of ice cream;

Fig. 2 is a vertical sectional view taken on a plane passing through the axis of the cone and through the cream;

Fig. 3 is a top plan view of one form of construction of cone, showing pockets of substantially rectangular shape inside the cone, with substantially trapezoidal drip slots between them;

Fig. 4 is a top plan view of another form of cone, in which the pockets are substantially triangular, the drip slots also being substantially triangular in shape;

Fig. 5 is another top plan view of a cone constructed according to the present invention, in which the pockets are substantially half circular; and Fig. 6 is a top plan view of another embodiment of the invention, in which the pockets are three sided, taking the form of substantially one-half of a hexagon.

Referring to Figs. 1 and 2, the cones 10 constructed according to the present invention are preferably molded and baked in the usual manner by means of molds which separate, and they are preferably provided on the outside of the cone with an ornamental configuration 11 which improves the appearance of the cone and also serves to prevent the cone from slipping in the hand of the user, since the ornamental configuration provides a better grip.

The present invention may be used in cones of various different shapes, including the cones which are conical from the top to the bottom, but they are preferably embodied in cones having a smaller conical handle 12 and a bowl or enlargement 13 at the top. Between the bowl 13 and the handle 12 the cone is preferably provided with an enlarged ring 14, providing a stop for engaging the interior of an adjacent cone when the cones are nested together.

The cone is provided with a bowl wall 15 which may be slightly thicker than the rest of the cone in order to give the cone sufficient strength to withstand pressure of the portion of ice cream 16 against the top of the cone with the dipper. The bowl wall 15 is provided with a relatively flat upper edge 16 and with an inner surface 17 that is curved substantially like the outer surface 18. Inside of the bowl 13 the cone is preferably provided with a multiplicity of pockets 19, the pockets 19 each being formed by a pocket wall 20 which begins at the bowl wall 15, extends inward, and then extends outward again to the bowl wall 15.

The pocket walls are so shaped that they join the cone at the point 21, at the bottom, at approximately the point where the bowl joins the conical handle 12, thereby providing the multiplicity of closed pockets 19. The pocket walls 20 of the successive pockets are spaced from each other to provide spaces 22 between the pockets down which drippings from the ice cream 16 may run into the chamber 23 provided inside the conical handle 12.

Various shapes of pockets may be used; for example, in Fig. 4 the pockets 19 are triangular, the pocket wall 20 comprising two portions 24, 25 at an angle to each other, and joining the bowl wall 15 so as to form a substantially triangular pocket. The slots or spaces 22 between the pockets 19 in this case are also substantially triangular, when considered in connection with the half ball of ice cream 16.

Referring to Fig. 3, in this case the pockets 19 are formed by a radially extending wall 26, an inner wall 27 at right angles, and another radially extending wall 28, thereby making the pockets substantially rectangular. The spaces 22 between the pockets are then substantially trapezoidal, but in other embodiments of the invention the pockets might be made trapezoidal and the spaces rectangular.

Referring to Fig. 6, here the pockets are provided with an inwardly extending wall 29, a peripherally extending wall 30, and an outwardly extending wall 31, these walls being at an angle of 120 degrees to each other, forming substantially half of a hexagon.

In this case the spaces or slots 22 between the sockets are substantially triangular.

Referring to Fig. 5, in this embodiment the pocket walls 20 are substantially hemi-cylindrical, and the spaces 22 between them are substantially rectangular when considered in connection with the ice cream.

The pocket walls 20 preferably terminate in a flat, upper edge 32, all of the pockets terminating in the same plane, which is slightly below the upper edge 16 of the bowl wall 15. The cone may be used with a ball of ice cream 16, which is substantially a fit inside of the bowl wall 16, the ice cream resting upon the upper edges 31 of the pocket walls. In other embodiments of the invention the ball 16 may be slightly smaller, as shown on the right side of Fig. 2, at 32.

The pockets 19 may be filled with nuts or with syrup, or they may be left empty for the purpose of catching drippings from the ice cream. When they are used with nuts, syrup, or other confections, the ice cream cone becomes similar to an ice cream sundae. As distinguished from the prior art, whenever a portion of the side of the cone is eaten away, this does not permit syrup or the drippings to run down the end of a groove, but each pocket remaining at the top of the cone is still adapted to perform its function in the same way. Each remaining pocket still holds its syrup drippings, nuts, and the spaces between the pockets are still maintained clear and unobstructed for the passage of drippings to the chamber 23 in the cone.

When the pockets 19 are not used to receive any additional food material, they, as well as the slots 22, are adapted to pass drippings from the ice cream 16 into the cone. When the pockets are full of some food material, then the drippings flow over the edges of the pockets into the slots 22 and are still kept inside the cone. Even if the cone 16 is large enough, completely filling the top of the bowl wall 15, the melting of the ice cream soon makes the ball smaller and opens the slots 22 to the flow of drippings from all parts of the top of the ice cream 16. In any event, the slots 22 are immediately available to receive drippings from the lower portion of the ice cream, and when the ball of ice cream 16 is made smaller than the top of the cone, as shown at 32, there is free and unobstructed passage for drippings from the top of the cream, as soon as it starts to melt.

It will thus be observed that I have invented an improved form of ice cream cone which is adapted to prevent drippage, the drippage being caught in separate pockets or directed into the conical handle of the cone by means of conduits from the ice cream into the internal chamber.

The present cone may be used to provide a confection which is similar to an ice cream sundae, since the syrup, nuts, and other confections may be used in the pockets, and such confections are not immediately freed, to run out as soon as a portion of the cone has been eaten away, but are held available for consumption in small portions with the ice cream.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. An ice cream cone comprising an edible container having on its interior wall adjacent the top a plurality of separate spaced pockets adapted to receive drippings from the ice cream as the ice cream melts, said pockets having their upper edges below the upper edge wall of the cone whereby drippage is directed into the pockets and confined in the cone by the outer wall of the cone, said pockets being spaced from each other peripherally of the cone, thereby providing conduits between the pockets whereby drippage may run into the handle of the cone, the upper edge surfaces of the pockets being adapted to support the portion of ice cream which is located within the outer upper wall of the cone.

2. In an ice cream cone, an edible container having a substantially conical handle with a partially spherical enlargement at the top and a plurality of inwardly projecting pockets formed on said partially spherical enlargement on the inside and extending from a point below the upper edge of said enlargement to said conical handle, said pockets being formed of separate walls spaced from each other, providing spaces between the pockets for drippage from the ice cream to flow into the conical handle, each of said pockets being formed with a pair of straight walls at an angle to each other to provide a substantially triangular pocket.

3. In an ice cream cone, an edible container having a substantially conical handle with a partially spherical enlargement at the top and a plurality of inwardly projecting pockets formed on said partially spherical enlargement on the inside and extending from a point below the upper edge of said enlargement to said conical handle, said pockets being formed of separate walls spaced from each other, providing spaces between the pockets for drippage from the ice cream to flow into the conical handle, each of said pockets being formed of a plurality of substantially straight walls at right angles to each other, thereby providing substantially rectangular pockets.

4. In an ice cream cone, an edible container having a substantially conical handle with a partially spherical enlargement at the top and a plurality of inwardly projecting pockets formed on said partially spherical enlargement on the inside and extending from a point below the upper edge of said enlargement to said conical handle, said pockets being formed of separate walls spaced from each other, providing spaces between the pockets for drippage from the ice cream to flow into the conical handle, each of said pockets being formed with an inner wall and a pair of diagonally extending walls forming a four sided, half hexagonal pocket.

5. In an ice cream cone, an edible member of substantially conical shape for holding a portion of ice cream and a plurality of segregated portions of fluid material comprising a substantially conical handle having an enlargement at the top formed by an outwardly bowed integral wall, said enlargement being of such shape that its outer wall is adapted to embrace the ice cream filling intended to be supported by said cone, said outer wall having a plurality of inwardly extending walls joined at spaced intervals to said outer wall and projecting inwardly into said cone, said inner walls forming a plurality of pockets in said cone, said pockets being open at the top and closed at the bottom for receiving liquid material, and said pockets having between them spaces for permitting the drippings from the portion of ice cream to run down into said cone, and said inner walls terminating short of the upper and outer wall of said cone whereby the drippings will be directed either into the pockets or the spaces between said pockets.

LARRY PAPE.